United States Patent [19]

Kabel

[11] Patent Number: 4,796,858
[45] Date of Patent: Jan. 10, 1989

[54] DUAL SEAL VALVE

[75] Inventor: Terry D. Kabel, Duncan, Okla.

[73] Assignee: Halliburton Company, Duncan, Okla.

[21] Appl. No.: 104,721

[22] Filed: Oct. 1, 1987

[51] Int. Cl.$^4$ .......................................... F16K 15/14
[52] U.S. Cl. ..................... 251/171; 251/314; 137/860; 277/92; 277/165
[58] Field of Search .............. 251/171, 174, 309, 314, 251/315, 162, 192; 137/860; 277/92, 165, 186, 188 R, 188 A

[56] References Cited

U.S. PATENT DOCUMENTS

| | | | |
|---|---|---|---|
| 2,813,695 | 11/1957 | Stogner | 251/159 |
| 2,911,187 | 11/1959 | Owsley | 251/316 |
| 2,954,961 | 10/1960 | Stogner et al. | 251/312 |
| 3,133,722 | 5/1964 | McGuire et al. | 251/309 |
| 3,195,900 | 7/1965 | Schoenrock | 277/92 X |
| 3,226,080 | 12/1965 | Lowrey | 251/309 |
| 3,228,652 | 1/1966 | Antrim | 137/860 X |
| 3,307,826 | 3/1967 | Lowrey | 251/332 X |
| 3,379,410 | 4/1968 | Stewart, Jr. | 137/860 X |
| 3,605,792 | 9/1971 | Westbrook | 137/312 |
| 3,667,727 | 6/1972 | Bowden | 251/172 |
| 3,749,357 | 7/1973 | Fowler | 251/315 X |
| 3,838,844 | 10/1974 | Arn | 251/315 X |
| 3,920,036 | 11/1975 | Westenrieder | 137/315 |
| 3,991,975 | 11/1976 | Sirbuava | 251/309 X |
| 4,155,536 | 5/1979 | Saiki | 251/332 |
| 4,252,331 | 2/1981 | Siegel | 277/165 X |
| 4,295,654 | 10/1981 | Kawamura et al. | 277/92 |
| 4,511,150 | 11/1985 | Seguenot | 251/171 X |
| 4,702,482 | 10/1987 | Oseman | 277/165 |

Primary Examiner—A. Michael Chambers
Assistant Examiner—John C. Fox
Attorney, Agent, or Firm—James R. Duzan; Neal R. Kennedy

[57] ABSTRACT

A dual seal valve having a bubble-tight primary seal and a metal-to-metal secondary seal for sealing engagement with a rotating valve element. The primary seal is preferably a composite seal comprising a relatively hard, high lubricity element bonded to a relatively soft, resilient elastomeric element. The elastomeric element biases the hard element into sealing engagement with the valve element. Several embodiments of the primary seal are disclosed. Tapered inserts are positioned on opposite sides of the valve element, and a seal groove is provided on a tapered outer surface of the insert and adapted for receiving a seal therein. The groove has an enlarged portion which provides a seal relief, allowing deformation and unsealing disengagement of the seal when pressure thereon exceeds a predetermined level. While plug valve embodiments are disclosed, the dual seal arrangement and seal relief are also applicable to ball valves, spherical plug valves, and other valve types having rotating valve elements.

18 Claims, 4 Drawing Sheets

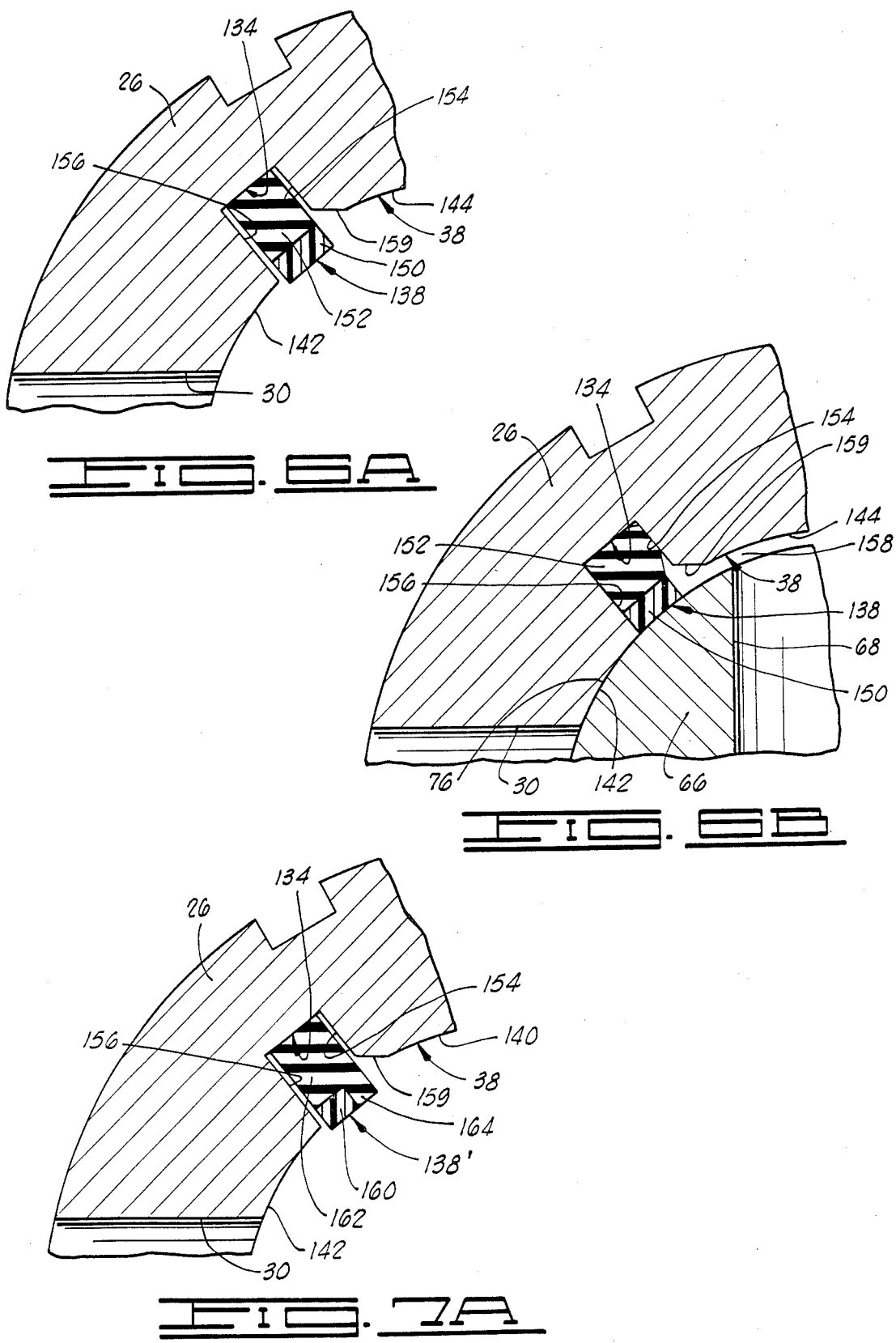

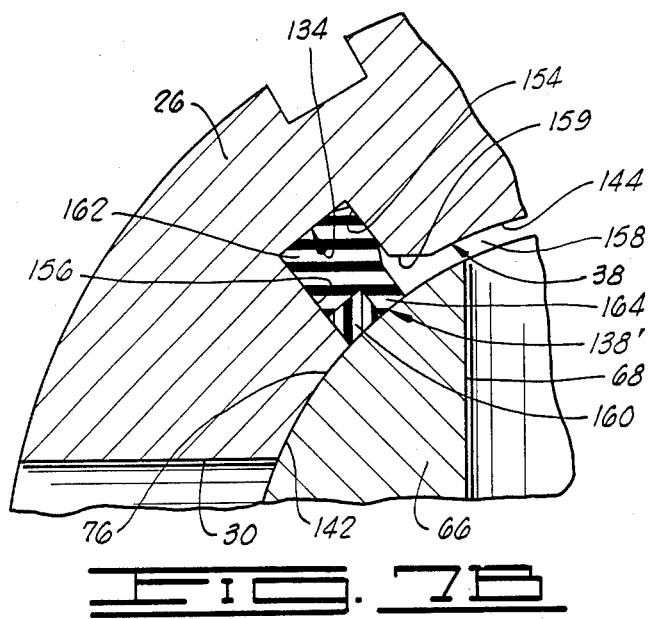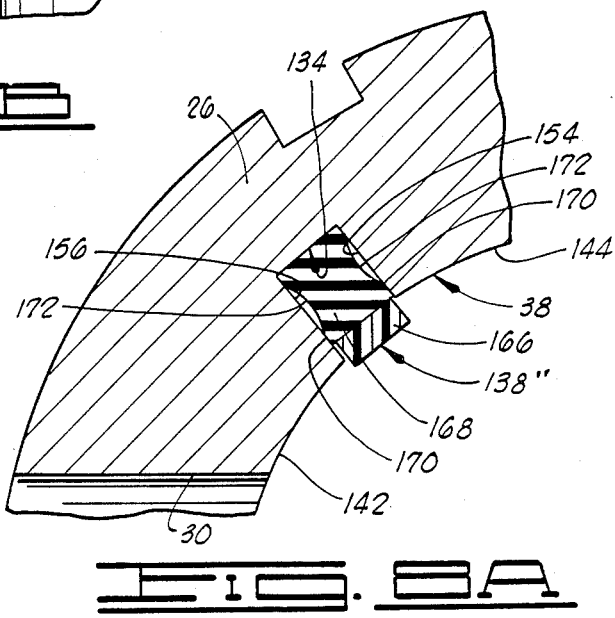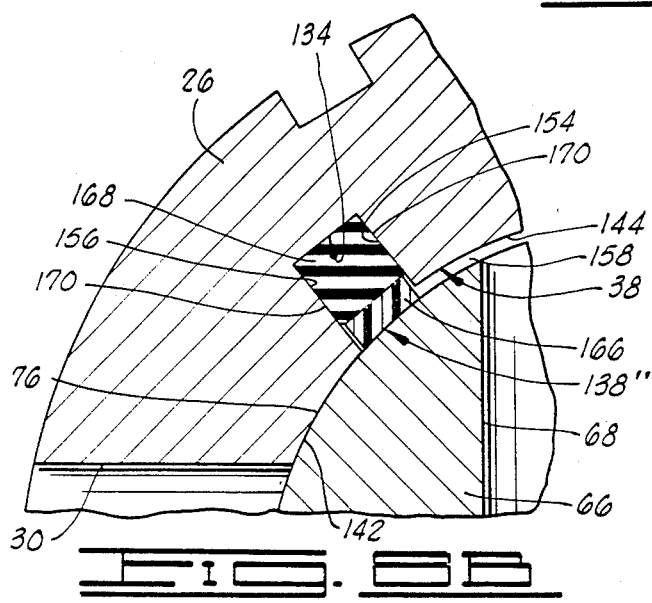

DUAL SEAL VALVE

BACKGROUND OF THE INVENTION

1. Field of the Invention

This invention relates to valves, and more particularly, to a dual seal valve having a resilient primary seal and a metal-to-metal secondary seal. While a cylindrical plug valve is illustrated herein, the dual seal configuration is also applicable to ball valves, spherical plug valves, and other valve types with rotating valve elements.

2. Description of The Prior Art

Plug valves, and particularly plug valves of the tapered plug type, are well known. However, tapered plug valves are not well suited to high pressure conditions because the pressure tends to unseat the plug. To overcome this problem, firm seating of the plug is necessary which results in the disadvantage of greatly increased torque necessary to rotate the plug in its bore.

One way of overcoming this problem with plug valves is to use a cylindrical plug with an insert having a cylindrical inner surface and a tapered outer surface. This type of valve is disclosed in U.S. Pat. Nos. 2,813,695 to Stogner and 2,954,961 to Stogner et al., both assigned to the assignee of the present invention. In this kind of valve, an adjusting nut engages the insert wedging it between the valve body and the cylindrical plug, thus forcing metal-to-metal contact between the inner surface of the insert and the outer surface of the plug. An O-ring or similar seal provides sealing engagement between the outer surface of the insert and the valve body. Because the contact between the valve plug and the insert is along a cylindrical surface, the torque required to rotate the plug is considerably less than that of a tapered plug type valve. This insert type plug valve has been used successfully, but has some limitations in critical gas handling conditions because the metal-to-metal contact between the insert and cylindrical plug generally cannot be relied on to provide long-lasting, bubble-tight sealability as required by more stringent service specifications, such as those of the American Petroleum Institute. The present invention solves this problem by providing a resilient primary seal while still having a metal-to-metal secondary seal as a backup. The primary seal provides the bubble-tight sealability necessary in these more severe conditions.

A plug valve having elastomeric seals between inserts and a cylindrical plug is disclosed in U.S. Pat. No. 3,194,534 to Sachnik. However, the inserts in this valve are not tapered, and therefore, cannot provide the metal-to-metal seal as does the present invention.

Additionally, if a purely elastomeric material, such as rubber, were used for the seals in devices such as Sachnik, they are easily damaged as they pass over the openings in the plug. The valve in Sachnik contemplates the use of seal rings which are made of low friction and wear resistant plastic such as nylong, tetrafluorethylene (TFE), or other similar materials. Materials such as nylon and TFE do not have the tearing problems of rubber, but because they have no inherent resiliency, there are no internal stresses in the seal which can assure that it is maintained in good, sealing contact with the plug once the plug or seal has worn even slightly. The present invention solves this problem by providing a composite seal having a relatively hard, high lubricity element in contact with the valve element and an integrally molded, relatively soft, resilient elastomeric element which insures that the hard element is maintained in sealing engagement with the valve element.

U.S. Pat. No. 3,605,792 to Westbrook discloses a plug valve having a cylindrical plug and no inserts. Sealing between the plug and valve body is provided by a relatively resilient backup ring which fits in a groove in the body and resiliently biases a seal ring, made of a material such as TFE and also disposed in the groove in the body, against the plug. The backup ring and seal ring are separate elements, and therefore, the Westbrook valve is more difficult to assemble than the valve of the present invention using a composite ring. Further, Westbrook does not have any means for providing metal-to-metal sealing engagement against the cylindrical plug in addition to that provided by the seal rings. In other words, the Westbrook device is not a dual seal valve.

The present invention is an improvement over Westbrook because it uses a composite primary seal and has such metal-to-metal contact which provides a secondary seal in the event of failure of the primary seal. The metal-to-metal seal further acts to keep abrasives carried in the fluid handled by the valve from the primary seal.

SUMMARY OF THE INVENTION

The valve of the present invention comprises body means having inlet means and outlet means thereon and defining a central cavity therein in communication with the inlet and outlet means, insert means disposed in the central cavity and defining an opening therethrough in communication with at least one of the inlet and outlet means, and valve means disposed in the central cavity and rotatable with respect to the body means and the insert means. The valve means defines an opening therethrough in communication with the opening in the insert means when the valve means is in an open position and spaced from the opening in the insert means when in a closed position. One of the valve means and the insert means has a sealing surface thereon, and the other of the valve means and the insert means defines a seal groove therein adjacent the sealing surfaces. The valve further comprises composite seal means disposed in the seal groove and comprising a relatively hard, high lubricity element adapted for sealing engagement with the sealing surface, and a relatively soft, elastomeric element integrally connected to the hard element and adapted for resiliently biasing the hard element toward the sealing surface.

In the preferred embodiment, the valve additionally comprises metal-to-metal seal means, between the composite seal means and the opening in the insert means, for providing a metal-to-metal seal between the insert means and the valve means. The composite seal means acts as a primary seal means, and the metal-to-metal seal means acts as a secondary seal means for providing backup to the primary seal means. The metal-to-metal seal means further provides a means for keeping abrasives away from the primary seal means.

Preferably, the insert means is one of a pair of such insert means disposed on opposite sides of the valve means, wherein one of the insert means is adjacent the inlet means and the other of the insert means is adjacent the outlet means. The cavity in the body means is at least partially bounded by a tapered wall in the body means, and the insert means has a tapered outer surface engaged with the tapered surface in the body means.

The valve may further comprise adjusting means for adjusting a relative position between the insert means and the body means. An insert holder may be used for locating the insert means, and in this embodiment, the adjusting means is used for adjusting a relative position between the insert holder, and thus the insert means, and the body means.

Several embodiments of the composite seal means are disclosed. In a first embodiment, the hard element extends across the full face of the composite seal means. Radial side walls of the composite seal means are spaced from corresponding side walls of the seal groove when the composite seal means is in a free position with the valve means removed, and the elastomeric element is deformed such that the side walls of the elastomeric element are at least partially engaged with the side walls of the seal grooves when the composite seal means is in an operating position in the valve.

In a second embodiment of the composite seal means, the elastomeric element has an extended portion for sealing engagement with the sealing surface adjacent the hard element.

In a third embodiment of the composite seal means, at least one radial side wall of the composite seal means defines an annular concave groove therealong such that at least a portion of the side wall of the elastomeric element is spaced from a corresponding side wall of the seal groove.

In an alternate embodiment of the valve, at least one of the insert means and the body means defines a second groove therein in communication with the cavity and extending around the opening in the insert means, wherein the second groove has an enlarged portion extending away from the opening in the insert means. In this embodiment, the valve further comprises a seal disposed in the second groove for providing sealing engagement between the body means and the insert means when subjected to a pressure below a predetermined level. The seal is at least partially deformable into the enlarged portion of the second groove, and thereby sealingly disengaged, when the pressure exceeds this predetermined level. Thus, seal relief means are provided for a seal between the insert means and the body means.

It is an important object of the invention to provide a valve having two types of sealing for a rotatable valve element.

Another object of the invention is to provide a dual seal valve having a resilient primary seal means and a metal-to-metal secondary seal means.

A further object of the invention is to provide a valve having resilient seal means including a relatively hard, high lubricity element biased into sealing engagement with a rotatable valve element by a relatively soft, resilient, elastomeric element.

Still another object of the invention is to provide a dual seal valve meeting bubble-tight sealability service specifications.

An additional object of the invention is to provide seal relief means for providing disengagement of a seal between an insert and a valve body when a pressure on the seal exceeds a predetermined level.

Additional objects and advantages of the invention will become apparent as the following detailed description of the preferred embodiment is read in conjunction with the drawings which illustrate such embodiments.

BRIEF DESCRIPTION OF THE DRAWINGS

FIG. 6A is a detailed, partial horizontal cross section of the insert with a first embodiment primary sealing means in a free position with a valve element removed.

FIG. 6B shows the primary sealing means embodiment in FIG. 6A in an operating position with the valve element installed.

FIG. 7A is a detailed, partial horizontal cross section of the insert with a second embodiment primary sealing means in a free position.

FIG. 7B shows the primary sealing means embodiment in FIG. 7A in an operating position.

FIG. 8A is a detailed, partial horizontal cross section of the insert with a third embodiment primary sealing means in a free position.

FIG. 8B shows the sealing means embodiment in FIG. 8A in an operating position.

DETAILED DESCRIPTION OF THE PREFERRED EMBODIMENTS

Figure 1:
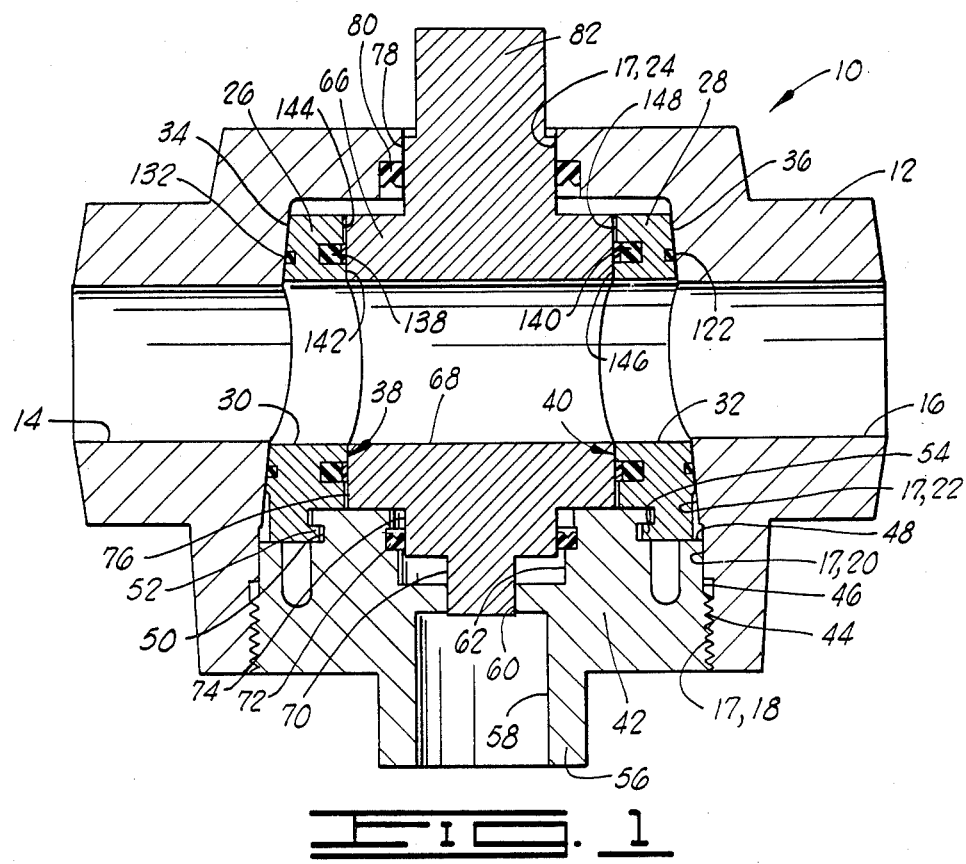
FIG. 1 shows a longitudinal cross section of a plug valve embodiment of the dual seal valve of the present invention.

Referring now to the drawings, and more particularly to FIG. 1, a plug valve embodiment of the dual seal valve of the present invention is shown and generally designated by the numeral 10.

Valve 10 includes a valve body 12 having an inlet 14 and an outlet 16, wherein the inlet and outlet are preferably both on a longitudinal axis of body 12. Body 12 also has a central opening 17 therein defined and bounded by a threaded opening 18, a first cylindrical bore 20, a tapered bore or wall 22 which tapers inwardly and upwardly from first cylindrical bore 20, and a second cylindrical bore 24, all of which are preferably coaxial on a vertical axis substantially perpendicular to the longitudinal axis of body 12. While referred to as having a "vertical" axis herein because of the position shown in the drawings, it should be understood that the valve may be oriented in any direction.

An inlet side insert 26 and an outlet side insert 28 are disposed in the portion of central cavity 17 defined by tapered bore 22 in body 12. Inlet side insert 26 has an inlet side opening 30 therethrough which is aligned with inlet opening 14 in body 12, and outlet side insert 28 has an outlet side opening 32 therethrough aligned with outlet opening 16. Inlet side insert 26 and outlet side insert 28 have tapered sides 34 and 36, respectively, adapted for close relationship to tapered bore 22. Inlet side insert 26 and outlet side insert 28 have generally cylindrical inlet side inner surface 38 and outlet side inner surface 40, respectively, the details of which will be discussed in more detail herein.

An adjusting nut 42 is positioned in the lower end of body 12 and has an externally threaded surface 44 threadingly engaged with threaded opening 18 in body 12. A cylindrical outer surface 46 on adjusting nut 42 is adapted for close relationship to first cylindrical bore 20 in body 12, and an upwardly facing shoulder 48 extends inwardly from outer surface 46.

An outwardly facing, annular groove 50 is defined in the upper end of adjusting nut 42. Inlet side insert 26 has an inwardly directed flange 52 at the lower end thereof which extends into groove 50, and outlet side insert 28 has a similar inwardly directed flange 54 which is engaged with groove 50 on an opposite side thereof from flange 52. A lower end 56 of adjusting nut 42 is adapted for engagement by a wrench or other means for rotation, and it will be seen that, by rotation of adjusting nut 42, the relative position of inlet side insert 26 and outlet side insert 28 with respect to body 12 may be adjusted.

Adjusting nut 42 has a lower opening 58, a first bore 60, and a second bore 62, all of which are coaxial with the vertical axis of body 12 previously defined.

Rotatably disposed in body 12 and between inlet side insert 26 and outlet side insert 28 is a valve means 66, which in plug valve embodiment 10 may also be referred to as a plug or valve element 66. Plug 66 defines a plug opening 68 therethrough which, when valve 10 is in the open position shown in FIG. 1, is aligned with inlet opening 14, opening 30, opening 32 and outlet opening 16, thus providing full flow through the valve. When plug 66 is rotated to a closed position approximately 90° from the position shown in FIG. 1, opening 68 will be spaced and sealingly separated from the other openings as hereinafter discussed.

Plug 66 has a first outside diameter 70 in close, spaced relationship to first bore 60 in adjusting nut 42, and a second outside diameter 74 adjacent second bore 62 in adjusting nut 42. Sealing means 72 of a kind known in the art, provides sealing engagement between plug 66 and adjusting nut 42.

Plug 66 also has a third outside diameter 76 which way also be referred to as a plug sealing surface or main sealing surface 76. The engagement and interaction between sealing surface 76 and inlet and outlet side inserts 26 and 28 will be discussed in more detail hereinafter.

Plug 66 further has a fourth outside diameter 78 in close, spaced relationship to second cylindrical bore 24 of body 12. Sealing means 80, of a kind known in the art, provides sealing engagement between plug 66 and body 12. An upper end 82 of plug 66 extends outwardly from body 12 and is adapted for engagement by a wrench or other means for rotation. Thus, by actuation of upper end 82, plug 66 may be rotated and valve 10 correspondingly opened and closed.

Figure 2:
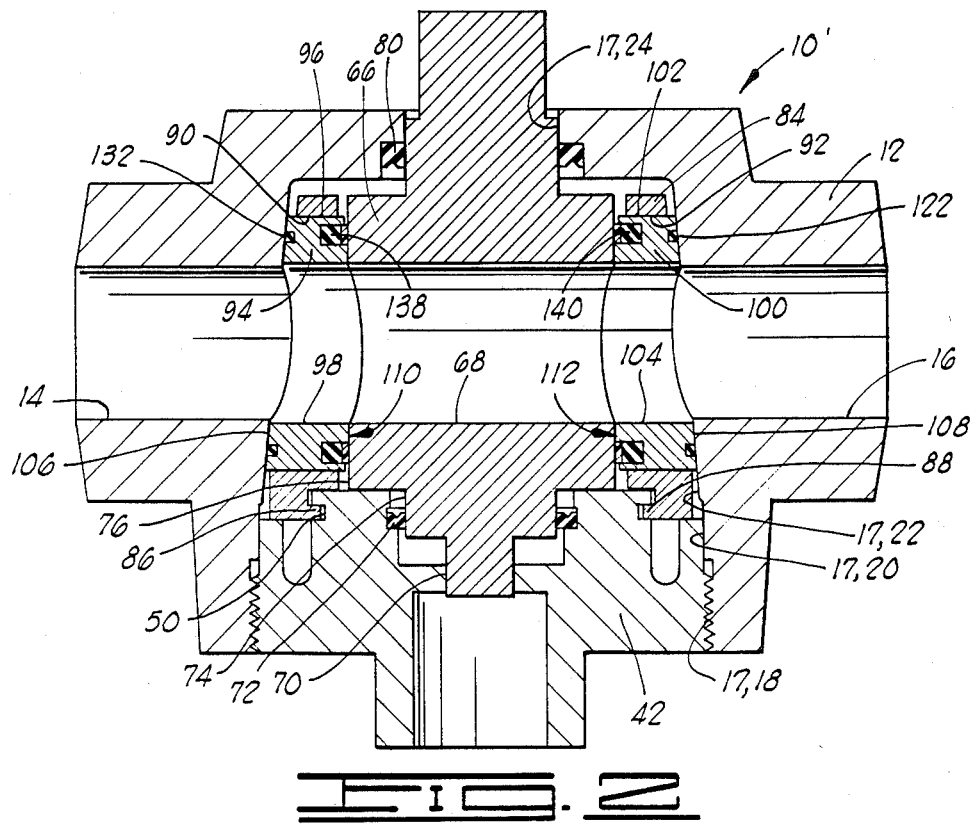
FIG. 2 is a longitudinal cross section of an alternate plug valve embodiment of the invention.

Referring now to FIG. 2, an alternate plug valve embodiment of the dual seal valve of the present invention is shown and generally designated by the numeral 10'. In valve 10', body 12, adjusting nut 42, plug 66 and sealing means 72 and 80 are identical to those for first embodiment 10. The only difference in valve 10' is in the construction and installation of the inlet and outlet side inserts.

In valve 10', an insert holder 84 is disposed in body 12 adjacent tapered bore 22. Insert holder 84 has inwardly directed flanges 86 an d88 at a lower end thereof which engage groove 50 in adjusting nut 42. Thus, by rotation of adjusting nut 42, the relative position of insert holder 84 with respect to body 12 may be adjusted.

Insert holder 84 defines a pair of aligned apertures 90 and 92 therethrough which are substantially coaxial with inlet and outlet openings 14 and 16 in body 12. Disposed in aperture 90 is an inlet side insert 94 having a cylindrical surface 96 in close, spaced relationship to aperture 90. Inlet side insert 94 defines an opening 98 therethrough which is aligned with inlet opening 14 in body 12. Similarly, an outlet side insert 100 is disposed in aperture 92 and has a cylindrical surface 102 in close, spaced relationship with aperture 92. Outlet side insert 100 defines an opening 104 therethrough which is in substantial alignment with outlet opening 16, and thus is also aligned with inlet opening 14 in body 12 and opening 98 in inlet side insert 94.

Inlet side insert 94 has a tapered outer surface 106, and outlet side insert 100 has a tapered outer surface 108, both of the tapered outer surfaces being in engagement with tapered bore 22 of body 12 in a manner substantially identical to the inlet and outlet side inserts of first embodiment 10. Inlet side insert 94 also has a generally cylindrical inner surface 110, and outlet side insert 100 has a similar generally cylindrical inner surface 112. Inner surface 110 and 112 interact with sealing surface 76 of plug 66 in a manner substantially identical to inner surfaces 38 and 40 of inlet and outlet side inserts 26 and 28 in first embodiment 10. The details of this interaction are described in more detail herein.

Figure 3:
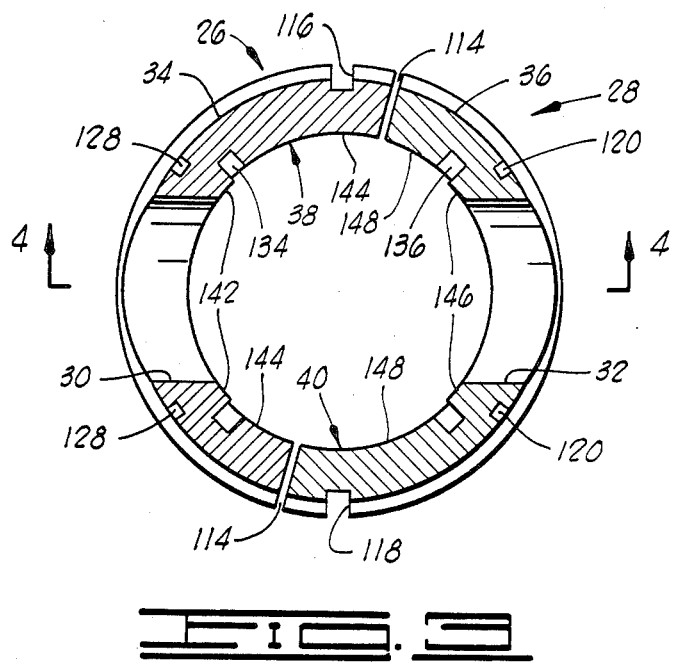
FIG. 3 is a horizontal cross section of inserts in the valve taken along a longitudinal axis of the valve.
Figure 4:
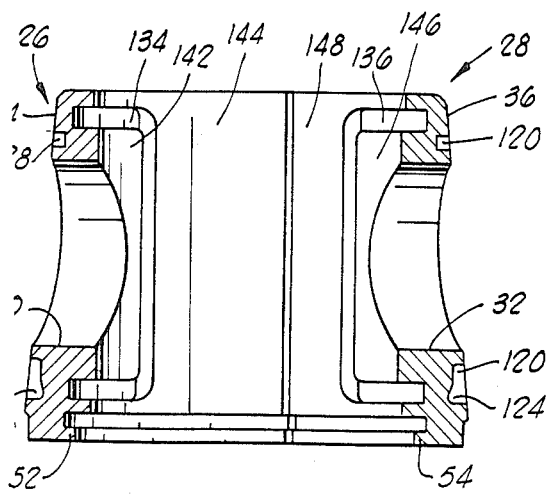
FIG. 4 is a longitudinal cross section of the inserts taken along lines 4—4 in FIG. 3.
Figure 5:
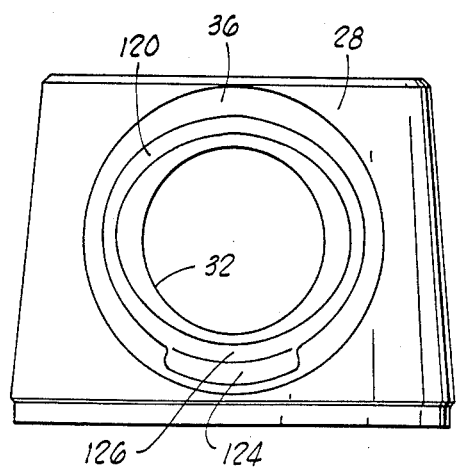
FIG. 5 shows a side elevation of an insert.

Referring now to FIGS. 3–5, details of inlet side insert 26 and outlet side insert 28 are shown. Both inserts are ordinarily formed as a single piece and then cut in half such that a gap 114 is formed therebetween as they are placed in central cavity 17 of body 12. Alternately, inserts 26 and 28 could be separately formed, such as by investment casting or the like. A vertical slot 116 is defined along outer surface 34 of inlet side insert 26, and an essentially identical vertical slot 118 is formed in outer surfaces 36 of outlet side insert 28. Slots 116 and 118 are adapted for receiving location pins (not shown) therein of a kind known in the art engaged with body 12. The interaction of the pins with slots 116 and 118 prevents rotation of inserts 26 and 28 with respect to body 12.

A seal groove 120 is defined in tapered outer surface 36 of outlet side insert 28. Seal groove 120 extends around opening 32 and is adapted to receive body seal means 122, such as an O-ring, shown in FIG. 1, which provides sealing engagement between outlet side insert 28 and tapered bore 22 of body 12. At the lower end of groove 120 is a downwardly enlarged and inwardly recessed portion 124. When pressure on seal means 122 is below a predetermined level, the seal means will remain in area 126 of groove 120 above enlarged portion 124. However, when the pressure exceeds the predetermined level, seal means 122 will be at least partially deformed into enlarged portion 124, relieving pressure on outlet side in sert 28. Thus, a seal relief means is provided for preventing fluid pressure from jamming outlet side insert 128 against plug 66 which could cause difficulties in rotation of the plug or locking of the plug altogether.

A similar seal groove 128 with an enlarged portion 130 is adapted to receive sealing means 132, shown in FIG. 1, for providing sealing engagement between inlet side insert 26 and tapered bore 22 of body 12. Enlarged portion 130 in groove 28 provides a relief means for seal means 132 such that inlet side pressure will not jam inlet side insert 26 against plug 66 so that difficulties in rotating plug 26 are eliminated.

Seal grooves in inlet and outlet side inserts 94 and 100 of alternate embodiment 10' are essentially identical to grooves 120 and 128, and thus will not be discussed separately. As shown in FIG. 2, seal means 122 and 132 are identical to those shown in first embodiment 10.

While plug valve embodiments 10 and 10' have been shown for the purposes of this disclosure, it will be seen by those skilled in the art that the above-described seal relief means could be equally applied to other valve configurations having insert means disposed in a body means. For example, such relief means could be adapted to ball valves, spherical plug valves, and other valve types with inserts and rotating valve means therein.

Referring again to FIGS. 3 and 4, inner surface 38 of inlet side insert 26 defines an inlet side seal groove 134 therein which extends around opening 30. Half of groove 134 is visible in FIG. 4, and it will be clear to those skilled in the art, that groove 134 appears generally square in configuration when viewed along the axis of opening 30. A substantially identical outlet side seal groove 136 is defined in inner surface 40 of outlet side insert 28. Seal grooves 134 and 136 are adapted for receiving primary valve seal means 138 and 140 therein, respectively. Primary seal means 138 provides sealing engagement between inlet side insert 26 and main seal surface 76 of plug 66, and primary seal means 140 provides sealing engagement between outlet side insert 28 and main sealing surface 76. The details of several embodiments of primary seal means 138 and 140 will be discussed further herein.

Identical grooves in inlet side insert 94 and outlet side insert 100 of second embodiment 10' are also adapted for receiving primary seal means 138 and 140, as shown in FIG. 2, and the following discussion is applicable to the second embodiment.

Again referring to FIGS. 1 and 3, inner surface 38 of inlet side insert 26 has a first portion 142 totally surrounded by seal groove 134. First portion 142 is adapted for metal-to-metal, sealing contact with main sealing surface 76 of plug 66, and thus may be also referred to as a secondary seal means 142. A second portion 144 of inner surface 38 is spaced radially outwardly with respect to the vertical axis of valve 10 from secondary seal means 142. That is, second portion 144 does not contact main sealing surface 76 of plug 66. It will be seen that seal groove 134 defines an inner boundary of second portion 144 of inner surface 38.

In an essentially identical manner, a first portion 146 of inner surface 40 of outlet side insert 28 is surrounded by seal groove 136. First portion 146 is adapted for metal-to-metal, sealing contact with main sealing surface 76 of plug 66, and thus may also be referred to as a secondary seal means 146. A second portion 148 of inner surface 40 is spaced radially outwardly with respect to the vertical axis of valve 12 from secondary seal means 146. In other words, second portion 148 of inner surface 40 does not contact main sealing surface 76 of plug 66, and seal groove 136 defines an inner boundary of second portion 148.

In all embodiments, main sealing surface 76 of plug 66 is a smooth, hard surface such as Stellite, and at least first portions 142 adn 146 of inner surfaces 38 and 40, respectively, are also very smmoth and are made of a non-galling material.

Primary seal means 138 and 140 provide bubble-tight sealability against plug 66. Even if primary seal means 138 and 140 become damaged, or as they gradually wear through use, the metal-to-metal contact provided by secondary seal means 142 and 146 acts as a backup, and in fact, will seal quite well, although cannot ordinarily be relied upon to be bubble-tight. Thus, dual sealing means are provided for valve 10 or 10'.

As already indicated, primary seal means 138 and 140 are essentially identical, and although the following discussion is directed toward primary seal means 138 and secondary seal means 142, it is equally applicable to primary seal means 140 and secondary seal means 146. Also in the following discussion it will be seen by those skilled in the art, that the dual seal arrangement provided by primary seal means 138, or alternate embodiments 138' or 138", and secondary seal means 142 is easily adapted to other valve configurations having a rotatable valve means therein. For example, in a ball valve embodiment or a spherical plug valve embodiment of the present invention, valve means 66 could have a generally spherical sealing surface with a corresponding generally spherical inner surface in the inserts. In other words, these other valve embodiments could be adapted to include resiliently biased primary seal means and metal-to-metal secondary seal means, and the invention is not intended to be limited to the specific plug valve configuration shown.

Referring now to FIGS. 6A and 6B, the first embodiment of primary seal means 138 is illustrated. In this embodiment, primary seal means 138 comprises a relatively hard, high lubricity element 150 bonded to or integrally molded with a relatively soft, resilient elastomeric element 152. Thus, primary seal means 138 may be referred to as a composite seal means 138. Hard element 150 is preferably made of a material such as reinforced TFE or nylon, and elastomeric element 162 is preferably made of a material such as nitrile or viton. In the embodiment shown in FIGS. 6A and 6B, hard element 150 extends across the entire inner face of primary seal means 130 and is the only portion thereof which contacts primary seal surface 76 of plug 66, as best seen in FIG. 6B.

As shown in FIG. 6A, the embodiment of primary seal means 138 is in a free, relaxed state with plug 66 removed. In such a position, the radial sides or side walls of primary seal means 138 are spaced from radial sides or side walls 154 and 156 of groove 134. In other words, primary seal means 138 is narrower in cross section than slot 134. However, once plug 66 is in place so that primary seal means 138 is in an operating position as shown in FIG. 6B, hard element 150 is deflected radially outwardly, partially compressing resilient element 152. Pressure transmitted through gap 158 between second portion 144 of inner surface 38 will force hard element 150 toward side 156 of groove 154, such that primary seal means 138 will generally appear as shown in FIG. 6B. A chamfer 159 is adjacent gap 158.

As seen clearly in the enlarged view of FIG. 6B, hard element 150 of primary seal means 138 is sealing engaged with main seal surface 76 of plug 66, and the hard element is biased toward plug 66 by the resilient, spring-like action of elastomeric element 152. Thus, elastomeric element 152 acts as a biasing means acting to force hard element 152 into sealing engagement with plug 66.

The view of FIG. 6B also clearly shows how first portion 142 of inner surface 38 acts as a secondary seal means against main seal surface 76 of plug 66 as a result of the metal-to-metal contact between these smooth surfaces. In addition to acting as a backup for primary seal means 138, this metal-to-metal contact provides a means for preventing abrasives in fluid flowing through opening 30 from easily reaching the primary seal means, thus minimizing the possibility of damage to the seal face on hard element 150 by such abrasives.

Referring now to FIGS. 7A and 7B, a second embodiment of the primary sealing means, designated by the numeral 138', is shown. Primary seal means 138' is somewhat similar to primary seal means 138 and includes a hard, high lubricity element 160, again made of a material such as reinforced TFE or nylon, and a relatively soft, resilient elastomeric element 162, such as nitrile or viton. Primary seal means 138' differs from primary seal means 138 in that hard element 160 does not extend across the full face of the primary seal means. Instead, elastomeric element 162 has an extended portion 164 which is substantially flush with hard element 160.

As seen in FIG. 7A, primary seal means 138' is dimensioned similarly to primary seal means 138 in that the radial sides of the primary seal means are spaced from radial sides 154 and 156 of seal groove 134. In a manner similar to primary seal means 138, when primary seal means 138' is engaged with plug 66 and under pressure through gap 158, hard element 160 and extended portion 164 of resilient element 162 are forced in a direction toward side wall 156 of seal groove 134, as shown in FIG. 7B.

The second embodiment primary seal means 138' has some advantages over first embodiment primary seal means 138 in that extended portion 164 of elastomeric element 162 provides sealing engagement with main sealing surface 76 of plug 66 even if hard element 160 wears after usage. However, hard element 160 still provides the necessary strength for supporting extended portion 164 of elastomeric element 162. An all elastomeric seal means would tend to extrude and tear without this reinforcement from hard element 160. First portion 142 of inner surface 38 again provides a secondary seal means against main sealing surface 76 of plug 66 because of the metal-to-metal contact between the two surfaces.

A third embodiment of the primary seal means is illustrated in FIGS. 8A and 8B, and generally designated by the numeral 138". For use with primary seal means 138", seal groove 134 is preferably constructed without a chamfer 159 between side wall 154 and second portion 144 of inner surface 38.

Primary seal means 138" again includes a relatively hard, high lubricity element 166, preferably made of reinforced TFE or nylon, and a relatively soft, resilient elastomeric element 168, preferably made of a material such as nitrile or viton. Hard element 166 extends across the full face of primary seal means 138", as illustrated, but it will be easily seen by those skilled in the art, that an extended portion of the elastomeric element, such as in second embodiment primary seal means 138', could be included if desired.

Elastomeric element 168 is sized such that radial sides or side walls 170 thereof will be in engagement with, or at least very close to, sides or side walls 154 and 156 of seal groove 134, even when in the free position shown in FIG. 8A. At least one of side walls 170 defines a concave annular channel 172 therealong. It will be seen by those skilled in that art that elastomeric element 162 thus has a total volume somewhat less than the volume of the portion of seal groove 134 in which the elastomeric element fits when in the free position of FIG. 8A. Thus, when plug 66 is in position as illustrated in FIG. 8B, elastomeric element 168 is]compressed such that concave channels 172 substantially disappear, and side walls 170 of the elastomeric element are pressed against side walls 154 and 156 of seal groove 134.

When pressure is applied to primary seal means 138" through gap 158, there will not be as much effect on elastomeric element 168 as on the elastomeric elements of the first two embodiments of the primary seal means because elastomeric element 168 is more nearly fully compressed originally. However, hard element 166 will probably be deflected at least slightly toward side wall 156 of seal groove 134, even though this is not specifically illustrated in FIG. 8B.

As with the other embodiments, first portion 142 of inner surface 38 provides secondary seal means against main sealing surface 76 of plug 66, thus acting as a backup for primary seal means 138" and providing means for preventing abrasives from reaching the primary seal means.

It will thus be seen that either embodiment valve 10 or 10', using any of primary seal means 138, 138' or 138", or variations thereof, provides a dual seal plug valve having primary seal means for bubble-tight sealability and metal-to-metal secondary seal means as a backup for the primary seal means. Thus, the present invention is well adapted to carry out the ends and advantages mentioned as well as those inherent therein. While presently preferred embodiments of the invention have been described for the purposes of this disclosure, numerous changes in the arrangement and construction of parts may be made by those skilled in the art. In particular, the resilient primary seal means/metal-to-metal secondary seal means construction could be easily adapted to other valve types, such as ball valves, spherical ball valves, and others having a rotating valve element. All such changes are encompassed within the scope and spirit of the appended claims.

What is claimed is:

1. A valve comprising:
    body means having inlet means and outlet means thereon and defining a central cavity therein in communication with said inlet and outlet means;
    insert means disposed in said central cavity and defining an opening therethrough in communication with at least one of said inlet and outlet means;
    valve means disposed in said central cavity and rotatable with respect to said body means and said insert means, said valve means defining an opening therethrough in communication with said opening in said insert means when said valve means is in an open position and spaced from said opening in said insert means when in a closed position, one of said valve means and said insert means having a sealing surface thereon and the other of said valve means and said insert means defining a seal groove therein adjacent said sealing surface; and
    composite seal means disposed in said seal groove and comprising:
        a relatively hard, high lubricity element adapted for sealing engagement with said sealing surface; and
        a relatively soft, elastomeric element integrally connected to said hard element and adapted for resiliently biasing said hard element toward said sealing surface,
        wherein a radial side wall of said composite seal means defines an annular concave groove therealong such that at least a portion of said side wall of said elastomeric element is spaced from a corresponding side wall of said seal groove.

2. The valve of claim 1 wherein said insert means is one of a pair of insert means disposed on opposite sides of said valve means, one of said insert means being adjacent said inlet means and the other of said insert means being adjacent said outlet means.

3. The valve of claim 1 further comprising metal-to-metal seal means, between said composite seal means and said opening in said insert means, for providing a metal-to-metal seal between said insert means and said valve means.

4. The valve of claim 1 wherein:
said cavity is at least partially bounded by a tapered surface in said body means; and
said insert means has a tapered outer surface engaged with said tapered surface in said body means.

5. The valve of claim 4 further comprising adjusting means for adjusting a relative position between said insert means and said body means.

6. The valve of claim 1 wherein:
radial side walls of said composite seal means are spaced from corresponding side walls of said seal groove when said composite seal means is in a free position; and
said elastomeric element is deformed such that said side walls of the elastomeric element are at least partially engaged with said side walls of said seal groove when said composite seal means is in an operating position.

7. The valve of claim 1 wherein said elastomeric element has an extended portion for sealing engagement with said sealing surface adjacent said hard element.

8. The valve of claim 1 wherein:
at least one of said insert means and said body means defines a second groove therein in communication with said cavity and extending around said one of said inlet and outlet means, said second groove having an enlarged segment, extending outwardly from a circumference of said second groove and inwardly in a direction toward said valve means; and
further comprising a seal disposed in said second groove for providing sealing engagement between said body means and said insert means when subjected to a pressure below a predetermined level, said seal being deformable into said enlarged segment of said second groove, and thereby sealingly disengaged, when said pressure exceeds said predetermined level.

9. The valve of claim 1 wherein said enlarged segment of said groove extends, in a direction towards said valve element, deeper into said insert than a remaining portion of said groove.

10. A valve comprising:
a body defining a central cavity therein and having an inlet and an outlet in communication with said central cavity;
a valve element disposed in said central cavity rotatable with respect to said body such that an opening through said valve element is in communication with said inlet and outlet when said valve element is in an open position;
an insert disposed in said central cavity adjacent said valve element and adjacent at least one of said inlet and outlet, said insert defining a groove in an outer surface thereof adjacent said body, said groove extending around said one of said inlet and said outlet and having a radially outwardly enlarged segment extending in a direction toward said valve element; and
body seal means disposed in said groove and providing sealing engagement between said insert and said body when a pressure in said one of said inlet and outlet is below a predetermined level, said body seal means being deformable out of said sealing engagement and into said enlarged of said groove when said pressure exceeds said predetermined level.

11. The valve of claim 10 wherein:
at least one of said valve element and an inner surface of said insert means defines a sealing surface; and
further comprising valve seal means disposed between said insert and said valve element and comprising:
a relatively hard, high lubricity portion adapted for engagement with said sealing surface; and
a relatively soft, elastomeric element for biasing said hard element into said engagement with said sealing surface.

12. The valve of claim 11 wherein said valve and said insert are adapted for providing metal-to-metal sealing therebetween inwardly of said valve seal means.

13. A plug valve comprising:
a body having an inlet and an outlet and defining a central cavity therein in communication with said inlet and outlet, at least a portion of said central cavity being bounded by a tapered wall;
an inlet side insert disposed adjacent said inlet and defining an inlet side insert opening in communication with said inlet, said inlet side insert having a tapered outer surface adapted for engagement with said tapered wall of said body and a substantially cylindrical inlet side inner surface, said inlet side inner surface having a sealing portion thereon adjacent said inlet side insert opening and defining an inlet side groove therein surrounding said sealing portion;
an outlet side insert disposed adjacent said outlet and defining an outlet side insert opening in communication with said outlet, said outlet side insert having a tapered outer surface adapted for engagement with said tapered wall of said body and a substantially cylindrical outlet side inner surface, said outlet side inner surface having a sealing portion thereon adjacent said outlet side insert opening and defining an outlet side groove therein surrounding said sealing portion on said outlet side inner surface;
a substantially cylindrical plug disposed in said central cavity between said inserts and having a plug opening therethrough in communication with said insert opening when said valve is in an open position, said plug having a plug sealing surface thereon; and
resilient seal means disposed in each of said grooves for providing sealing engagement between said plug sealing surface and said inserts outwardly of said sealing portions on said inner surfaces of said inserts, said sealing portions providing metal-to-metal sealing with said plug sealing surface, wherein at least one of said tapered walls in said body and the tapered outer surface of at least one of said inserts defines a seal groove therein surrounding the opening in the corresponding insert, said seal groove having an enlarged segment extending radially outwardly away from said opening in said corresponding insert and in a direction toward said cylindrical plug; and
further comprising a resilient seal disposed in said seal groove for providing sealing engagement between said body and said one of said inserts when a pressure exerted on said seal is below a predetermined level, said seal being at least partially deformable into said enlarged segment when said pressure exceeds said predetermined level.

14. The plug valve of claim 13 further comprising an insert holder disposed in said central cavity for holding said inserts in a relative position with respect to said plug and said inlet and outlet.

15. The plug valve of claim 13 wherein:
radial side walls of said resilient seal means are spaced from corresponding side walls of said grooves when said resilient seal means is in a free position with said plug removed; and
said resilient seal means is deformed for sealing engagement with at least one of said side walls of said groove when said resilient seal means is in a sealing position.

16. The valve of claim 13 wherein said resilient seal means comprises:
a relatively hard, high lubricity element for sealing engagement with said plug sealing surface; and
an elastomeric element for biasing said hard element into said sealing engagement.

17. The valve of claim 16 wherein said elastomeric element has an extended portion for sealing engagement with said plug sealing surface adjacent said hard element.

18. The valve of claim 13 wherein a radial side wall of said resilient seal means defines an annular groove therealong such that at least a portion of said radial side wall is spaced from a corresponding side wall of said groove.

* * * * *

UNITED STATES PATENT AND TRADEMARK OFFICE
CERTIFICATE OF CORRECTION

PATENT NO. : 4,796,858
DATED : January 10, 1989
INVENTOR(S) : Terry D. Kabel

It is certified that error appears in the above-identified patent and that said Letters Patent is hereby corrected as shown below:

In column 1, line 58 delete [nylong] and insert therefore --nylon--.

In column 3, line 17 delete [grooves] and insert therefore --groove--.

In column 5, line 34 delete [way] and insert therefore --may--.

In column 5, line 58 delete [an d88] and insert therefore ---and 88--.

In column 6, line 49 delete [in sert] and insert therefore --insert--.

In column 9, line 57 delete [that] and insert therefore --the--.

In column 9, line 62 delete [is]compressed] and insert therefore --is compressed--.

Signed and Sealed this

Sixth Day of June, 1989

*Attest:*

DONALD J. QUIGG

*Attesting Officer*  *Commissioner of Patents and Trademarks*